United States Patent
Ho et al.

(10) Patent No.: US 11,669,650 B2
(45) Date of Patent: Jun. 6, 2023

(54) AUDIT OF COMPUTER-AIDED DESIGN DOCUMENTS

(71) Applicant: Nuvolo Technologies Corporation, Paramus, NJ (US)

(72) Inventors: Khoa Nguyen Van Ho, Houston, TX (US); Tao Ye, Cypress, TX (US); Tejas Yadav, West Haven, CT (US)

(73) Assignee: Nuvolo Technologies Corporation, Paramus, NJ (US)

(*) Notice: Subject to any disclaimer, the term of this patent is extended or adjusted under 35 U.S.C. 154(b) by 225 days.

(21) Appl. No.: 17/109,854

(22) Filed: Dec. 2, 2020

(65) Prior Publication Data

US 2022/0171892 A1 Jun. 2, 2022

(51) Int. Cl.
*G06F 30/13* (2020.01)
*G06F 30/17* (2020.01)
*G06F 111/20* (2020.01)
*G06F 111/04* (2020.01)
*G06F 111/02* (2020.01)

(52) U.S. Cl.
CPC .............. *G06F 30/13* (2020.01); *G06F 30/17* (2020.01); *G06F 2111/02* (2020.01); *G06F 2111/04* (2020.01); *G06F 2111/20* (2020.01)

(58) Field of Classification Search
CPC .......... G06F 30/13; G06F 30/00; G06F 30/17; G06F 2111/04; G06F 2111/20; G06F 2111/02
USPC ............................................................. 703/1
See application file for complete search history.

(56) References Cited

U.S. PATENT DOCUMENTS

| | | | |
|---|---|---|---|
| 6,341,291 B1 | 1/2002 | Bentley et al. | |
| 8,155,943 B2 | 4/2012 | Nasle | |
| 8,818,769 B2 | 8/2014 | Trainer et al. | |
| 9,454,623 B1 | 9/2016 | Kaptsan | |
| 10,121,286 B2 | 11/2018 | Alsaffar et al. | |
| 10,445,438 B1 * | 10/2019 | Motonaga | G06F 30/13 |
| 2007/0186160 A1 | 8/2007 | McArdle et al. | |
| 2008/0172605 A1 * | 7/2008 | Smith | G06T 19/20 |
| | | | 715/243 |
| 2010/0169272 A1 | 7/2010 | Labatte et al. | |
| 2015/0106325 A1 | 4/2015 | Cole et al. | |
| 2016/0246899 A1 | 8/2016 | Hirschtick et al. | |
| 2016/0328421 A1 | 11/2016 | Sarratori et al. | |

(Continued)

OTHER PUBLICATIONS

Muller, Pascal et al., "Procedural Modeling of Buildings", 2006, Association for Computing Machinery, Inc. (Year: 2006).*

(Continued)

*Primary Examiner* — Cedric Johnson
(74) *Attorney, Agent, or Firm* — Mintz Levin Cohn Ferris Glovsky and Popeo, P.C.

(57) ABSTRACT

Systems and techniques for auditing computer-aided design documents are described. A described technique includes receiving a computer-aided design document for import to a space management program; determining whether the computer-aided design document violates a rule set, wherein the rule set is configured to detect issues that inhibit importation of data from the computer-aided design document to the space management program; selectively modifying the computer-aided design document by resolving a violation of the rule set; and providing the modified computer-aided design document to the space management program.

21 Claims, 10 Drawing Sheets

(56) References Cited

U.S. PATENT DOCUMENTS

| | | |
|---|---|---|
| 2017/0147717 A1 | 5/2017 | Chen et al. |
| 2018/0113878 A1 | 4/2018 | Duggal et al. |
| 2019/0213287 A1 | 7/2019 | Ye et al. |
| 2020/0285514 A1 | 9/2020 | Ghare et al. |
| 2020/0351337 A1 | 11/2020 | Calmon et al. |
| 2021/0073449 A1* | 3/2021 | Segev .................... G06F 30/20 |
| 2021/0383037 A1 | 12/2021 | Segev et al. |
| 2022/0092225 A1 | 3/2022 | Parker et al. |
| 2022/0092834 A1 | 3/2022 | Ye et al. |
| 2022/0171893 A1 | 6/2022 | Ye et al. |
| 2022/0188472 A1 | 6/2022 | Parker |
| 2022/0206445 A1 | 6/2022 | Reichl et al. |
| 2022/0206856 A1 | 6/2022 | Parker |
| 2022/0214999 A1 | 7/2022 | Yadav et al. |
| 2022/0215604 A1 | 7/2022 | Ho et al. |

OTHER PUBLICATIONS

Zhu, Junfang et al., "A New Reconstruction Method for 3D Buildings from 2D Vector Floor Plan", Dec. 19, 2013. (Year: 2013).*

Chen, Jiacheng et al., "Floor-SP: Inverse CAD for Floorplans by Sequential Room-wise Shortest Path", 2019, IEEE/CVF International Conference on Computer Vision (ICCV), IEEE. (Year: 2019).*

Github.com, [online] "Deepzoom (php library)", Daniel-KM Library Deepzoom, retrieved on Aug. 17, 2020, retrieved from URL: https://github.com/Daniel-KW/LibraryDeepzoom, 4 pages.

Github.com, [online] "TiledSharp", Marshallward/TiledSharp, retrieved on Aug. 17, 2020, retrieved from URL: https://github.com/marshallward/TiledSharp, 4 pages.

Stackexchange.com, [online] "If Geographic Coordinates are unprojected coordinates, how can GIS soft wares display such unprojected data in a plane?", Geographic Information Systems, retrieved on Jun. 2, 2020, retrieved from URL: https://gis.stackexchange.com/questions/146321/if-geographic-coordinates-are-unprojected-coordinates-how-can-gis-softwares-dis#:-:text, 2 pages.

Wikipedia, "Map projection", retrieved from URL: https://en.wikipedia.org/w/index.php?title=Map_projection&oldid=955953903, 2020, 16 pages.

Wikipedia, "Spatial reference system", retrieved from URL: https://en.wikipedia.org/w/index.php?title=Spatial_reference_system&oldid=956142752, 2020, 4 pages.

Wikipedia, "Tiled web map", retrieved from URL: https://en.wikipedia.org/w/index.php?title=Tiled_web_map&oldid=956139437, 2020, 3 pages.

Ekanayake et al. (2008) "MapReduce for Data Intensive Scientific Analysis", Fourth IEEE International Conference on eScience, 277-284 Pages.

* cited by examiner

FIG. 3C

AUDIT OF COMPUTER-AIDED DESIGN DOCUMENTS

BACKGROUND

This description relates to computing processes for auditing and resolving issues in computer-aided design documents.

Computer aided design (CAD) software has been developed and used to generate two-dimensional (2D) or three-dimensional (3D) representations of various things including objects and buildings. After designing, a CAD program can output a CAD document that is based on a file format, such as Drawing Exchange Format (DXF), DWG (AutoCAD drawing database file), and DGN (a file format created by the Open Design Alliance and Bentley Systems). Other file types are possible. A CAD document can provide data representations of one or more real-world constructs. These data representations can be, for example, 2D floorplans for a building, where the floorplans include different outlines for each room of a floor. Data representations of real-world constructs in separate CAD files can be encoded and arranged differently based on preferences and design choices used in a CAD program.

SUMMARY

Systems and techniques for auditing computer-aided design documents are described. An audit program, which can execute such techniques, can identify and fix issues with a CAD document, which represents a layout of a floor or an entire building, before import into a space management program. The space management program can extract information such as space names, types, and codes from the CAD document to facilitate space management of a floor or entire building represented by the CAD document. Issues such as missing information, superfluous information, or ambiguous boundaries can inhibit importation of data into the space management program. The audit program can automatically identify issue-prone practices such as unclosed polylines, missing space codes, duplicate space codes, multiple space code per polyline, and overlapping polylines and correct them.

A technique described herein includes receiving a computer-aided design document for import to a space management program; determining whether the computer-aided design document violates a rule set, the rule set being configured to detect issues that inhibit importation of data from the computer-aided design document to the space management program; selectively modifying the computer-aided design document by resolving a violation of the rule set; and providing the modified computer-aided design document to the space management program. Other implementations include corresponding systems, apparatus, and computer programs to perform the actions of methods defined by instructions encoded on computer readable storage.

These and other implementations can include one or more of the following features. In some implementations, modifying the computer-aided design document includes modifying a data structure. In some implementations, providing the modified computer-aided design document to the space management program includes providing the data structure to the space management program. Modifying the computer-aided design document by resolving the violation of the rule set can include providing a notification regarding the violation of the rule set; receiving a user input to resolve the at least one of the one or more rule violations; and modifying the computer-aided design document based on the user input. The notification can include a suggested resolution of the violation of the rule set.

Determining whether the computer-aided design document violates the rule set can include determining a region that is at least partially bound by a polyline within the computer-aided design document. Determining whether the computer-aided design document violates the rule set can include determining whether the polyline is unclosed or overlaps with another polyline within the computer-aided design document. Determining whether the computer-aided design document violates the rule set can include detecting whether the region is associated with two or more space codes, space names, or space types. Determining whether the computer-aided design document violates the rule set can include detecting whether the region is not associated with a space code, space name, or space type.

In some implementations, the rule set can include a set of valid space types. Determining whether the computer-aided design document violates the rule set can include determining whether a space type included in the computer-aided design document is in the set of valid space types. Determining whether the computer-aided design document violates the rule set can include detecting a space code of the computer-aided design document, and determining whether the space code is a duplicate space code within the computer-aided design document. Determining whether the computer-aided design document violates the rule set can include detecting whether there is a space code, space name, or space type that is not associated with a region that is at least partially bound by a polyline within the computer-aided design document.

Particular embodiments of the subject matter described in this specification can be implemented to realize one or more of the following advantages. One of more of the described techniques and systems can automatically detect issues such as rule violations without burdening a user for input. One of more of the described techniques and systems can in at least some cases automatically fix detected issues. One of more of the described techniques and systems can enable a successful importation of data from a CAD document into a space management program. One of more of the described techniques and systems can increase the accuracy of what is represented by the imported data. As such, the space management program can provide a better user experience by presenting a complete and accurate representation of an office space or other type of space.

The details of one or more implementations are set forth in the accompanying drawings and the description below. Other features and advantages will be apparent from the description and drawings, and from the claims.

BRIEF DESCRIPTION OF THE DRAWINGS

FIG. 3C shows a layout of an example of an audit window that identifies issues associated with metadata for a floorplan.

Like reference numbers and designations in the various drawings indicate like elements.

DETAILED DESCRIPTION

An audit program identifies and fixes issues with a CAD document, which represents a layout of a floor or an entire building, before import into a space management program. The space management program extracts information such as spaces, assets, and people (e.g., Mr. Smith is assigned to this office) from the CAD document to facilitate space management of a floor or entire building represented by the CAD document. These issues might otherwise inhibit importation of data into the space management program. The audit program can automatically identify bad practices such as unclosed polylines, missing space codes, duplicate space codes, multiple space code per polyline, and overlapping polylines and correct them.

Figure 1:
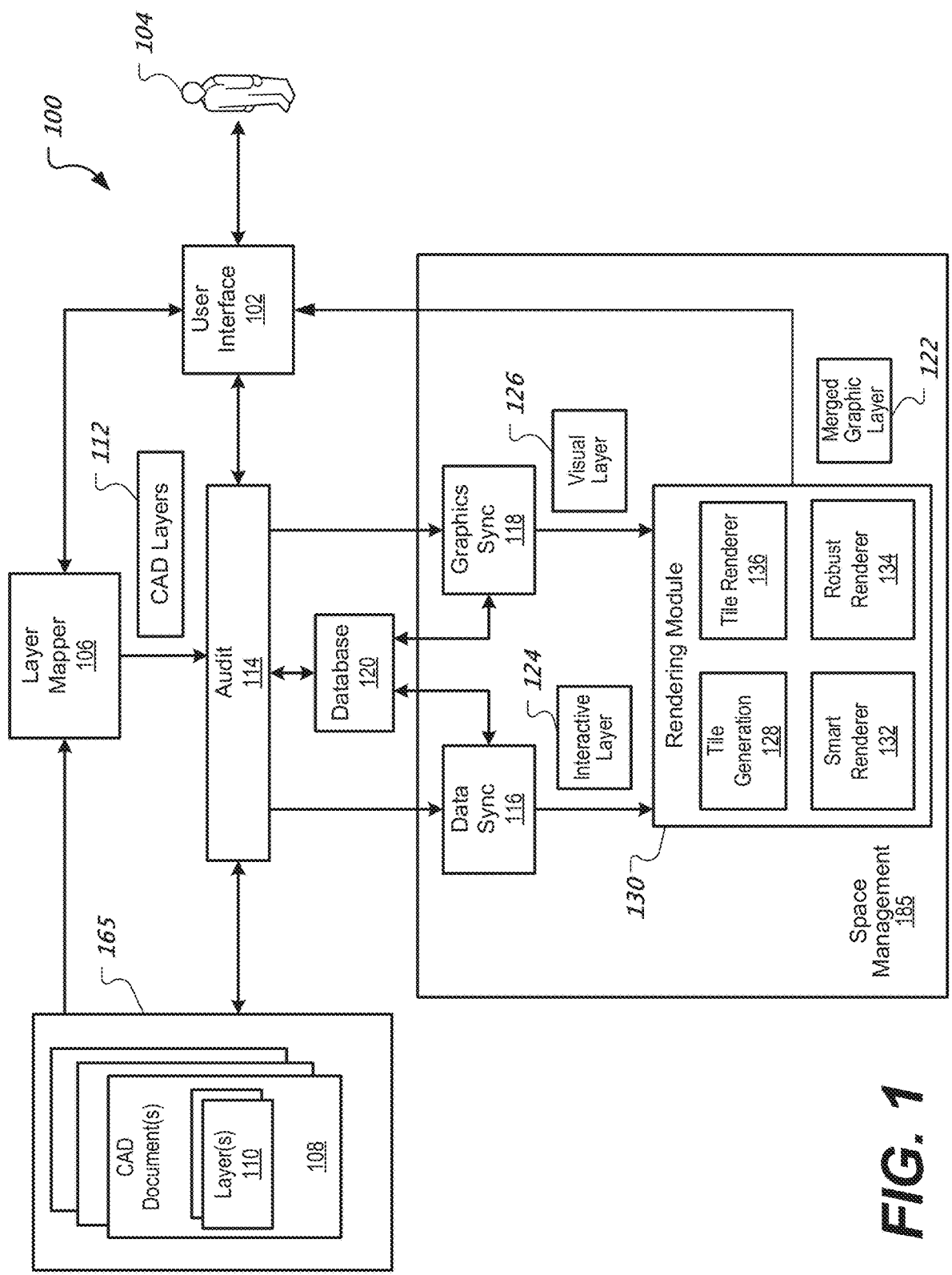
FIG. 1 shows an example of a computing system configured to process one or more CAD documents.

FIG. 1 shows an example of a computing system 100 configured to process one or more CAD documents 108. The system 100 includes a user interface 102 that interacts with a user 104, e.g., receives input from a user 104, or provides output to the user 104. The user interface 102 can graphically render output, such as information based on the CAD documents 108, to the user 104. The system 100 can include one or more computing devices, including a device operable to display a user interface 102 such as a graphical user interface (GUI), e.g., a desktop computer with a display monitor, a laptop computer, a tablet device, a smartphone, a networked client/mobile device, or other related devices. A computing device can be operable to exchange data communications with other devices (e.g., client and server devices) of the system 100.

A CAD document 108 can include one or more layers 110. A layer 110 of a respective CAD document 108 can correspond to an item of a geographic entity, such as a building or physical location. For example, each of the layers 110 can correspond to a respective item such as a floorplan of a floor in the building, a room of a floor in the building that is represented by the floorplan, or an interior or exterior wall of a room included in the floorplan. Additional details about individual layers and corresponding items that can be associated with a given layer are described in more detail below. A CAD document 108 can include information about the regions represented by a floorplan, e.g., a region's space code, space name, and space type.

In some implementations, the system 100 is configured to implement a framework for interpreting and extracting graphics and data elements of a CAD document 108 to digitally render the items of a building for presentation to the user 104. The graphics and data elements cooperate to present a digital representation of the items in an application program used to generate the CAD document 108. In some implementations, the CAD document 108 can be a file generated by a CAD program. The CAD document 108 can be based on a file format such as DXF, DWG, and can encode data representations of real-world items, such as the example items described above.

Data representations of real-world items in separate or distinct CAD documents 108, or even across distinct layers of a CAD document, can be encoded and arranged differently based on design preferences and drafting protocols used in the CAD program. Because these data representations are often encoded in a variety of ways, extracting specific types of information from a CAD document can be challenging. To address these challenges, the system 100 can include a set of modules which can be configured to execute a subset of the techniques for implementation of the framework used to extract graphics and data elements of a CAD document or present at least some of the extracted graphics, data elements, or both. These modules can be implemented as computer programs that are executable by one or more processors.

The system 100 includes a module called a layer mapper 106 which can receive one or more CAD documents 108. Each CAD document 108 can include one or more layers 110. In some implementations, the layer mapper 106 obtains the CAD documents 108 based on an input from user 104 which is received by way of user interface 102. In some implementations, the layer mapper 106 can receive or obtain the CAD documents 108 independent of input from user 104 but execute its file audit and data processing operations based on user input received by way of user interface 102.

In some implementations, the layer mapper 106 automatically imports the CAD documents 108 from a file storage 165 and automatically executes its layer mapping and data processing operations. The file storage 165 can include a computer-readable medium. The file storage 165 can be internal or external to the system 100. In some implementations, the file storage 165 includes a database 120. The database 120 can include one or more database tables for storing information about space hierarchies of a geographic location. The space hierarchies may define a physical layout of an area, office, campus, site, or floor of the geographic location. In some implementations, the CAD documents 108 are stored within the database 120. In some implementations, the database 120 resides in a memory.

The layer mapper 106 can be configured to obtain one or more of the CAD documents 108 and generate a layer mapping file based on processes performed on the received CAD documents 108. In some implementations, the processes can be executed by the layer mapper 106 based on a mapping template, user input from user 104, or both. In some implementations, the layer mapper 106 generates a layer mapping file based on instructions or commands specified by a space/system administrator ("space admin") that indicate operations to be performed on the CAD documents 108. In some cases, the space admin can be the same as user 104 or a different user of the system 100. The instructions can define or indicate layers of the CAD documents 108 as well as computer-aided facility management (CAFM) layers stored among database tables of the database 120.

The layer mapper 106 can select a mapping template that defines protocols for aggregating sets of data values of the different layers with respect to instructions and database values of CAFM layers as indicated by a space admin. For example, the layer mapper 106 can receive layer data for multiple layers of a CAD document 108, where the layer data specifies information for items such as hallways, offices on a floor, conference rooms, restrooms, types of furniture in the offices, locations of security cameras on the floor, or capabilities of various equipment such as network devices such as routers or Wi-Fi hotspots, printers, or copiers on the floor. The layer mapper 106 can use the template protocols to aggregate values for types of office furniture for a particular office while, for example, filtering out data values that indicate locations of security cameras on a floor.

More specifically, for one or more CAD documents 108, the layer mapper 106 can map portions of the layer data for different layers, such as furniture in the offices, to a hierarchy of CAFM layers (e.g., indicating each office on a floor), which can be defined in the database 120, to produce a grouping of CAD layers 112. For example, the grouping of CAD layers 112 can represent a group of offices on the 9th floor of a building along with each item of furniture in each office of the group. In some implementations, the layer mapper 106 determines the mapping between the drawing layers and the CAFM layers at least by processing data values of the different drawing layers (e.g., received inputs) against the protocols defined by the mapping template and with reference to any grouping preferences indicated by the user 104 or the space admin.

The layer mapper 106, in some implementations, generates a layer mapping output represented by CAD layers 112 based on the mapping between layers of the CAD documents 108 and CAFM layers in a database table of the database 120. In some implementations, the layer mapper 106 generates a layer mapping output that aggregates information such as data values and entity records of the received inputs based on the determined mapping of the layers. The layer mapper 106 can generate a layer mapping output that groups layer types such as the offices, the Wi-Fi hotspots, and the types of office furniture for visual rendering to an end-user, e.g., user 104 or a different user.

An audit module 114 can receive CAD documents 108 including their layers 112 from the layer mapper 106. The audit module 114 can detect and resolve issues that would otherwise inhibit importation of data from the CAD document 108 to a space management module 185. The audit module 114, for example, can apply one or more rule sets to a CAD document 108 to detect issues within the CAD document before importing the contents of the document into the space management module 185. In this example, the space management module 185 includes a data sync module 116, graphics sync module 118, and rendering module 130. Other, fewer, or more modules are possible.

In some implementations, the audit module 114 can process a CAD document 108 directly in file storage 165. In some implementations, the audit module 114 can process a version of the CAD document 108 stored in a computer memory such as a random access memory. In some implementations, the audit module 114 generates an audit output based on processes performed on the received inputs. In some implementations, the audit output includes a modified CAD document. In some implementations, the audit output includes a data structure.

The audit module 114, in some implementations, can be configured to process data corresponding to each of the CAD layers 112 to identify one or more deficiencies and generate an audit output file based on the identified deficiencies. The audit module 114 can scan each of the CAD layers 112 to detect individual deficiencies that may adversely impact a CAD document importation process executed by the system 100. In some implementations, the audit module 114 can read entity records that store data values for a layer to detect deficiencies such as unclosed polylines, missing space codes, missing space names, missing space types, or invalid space types. In some implementations, the audit module 114 detects deficiencies of a CAD document in response to processing data types of a layer or entity record of the CAD document against a predefined list of deficiency codes.

The audit module 114 can be configured to automatically resolve the detected deficiencies. In some implementations, audit module 114 can be configured to generate a notification about the detected deficiencies for rendering via the user interface 102. The notification can include one or more recommendations for addressing a detected deficiency of a CAD document 108. For example, the audit module 114 can generate a notification in response to determining that a space bounded by a polyline in a CAD document 108, e.g., a polyline specified in a CAD layer 112, is missing a space type field. The audit module 114 can determine that the space most likely corresponds to an "office space" type and can generate a recommendation for adding an "office space" type to this particular space. In some implementations, the audit module 114 generates a command to automatically input a value for the missing space type.

In some implementations, the audit module 114 is configured to standardize layer data of a CAD document for processing by one or more other modules or devices of the system 100. In some implementations, the audit module 114 generates an audit output from one or more groupings of CAD layers 112 based on processes performed on each of the CAD layers 112. The audit module 114 can provide the audit output to other modules in the system 100 including a data sync module 116 and a graphics sync module 118, which can both be included in the space management module 185.

As described above, the system 100 interprets and extracts graphics and data elements of a CAD document 108 at least to digitally render certain real-world items of a building for visualization to a user 104. The data sync module 116 can be configured to extract the data elements of the CAD document 108, whereas the graphics sync module 118 can be configured to extract the graphic elements of the CAD document 108. The data sync module 116 and the graphics sync module 118 can execute its respective extraction and syncing operations based on inputs that correspond to an audit output generated by the audit module 114 and the data associated with the one or more CAD documents 108.

The data sync module 116 can execute a workflow for extracting data values of layers identified in the mapping output and for generating data structures used to stage or preview information linked to groupings of layers in the mapping output. The graphics sync module 118 can execute a workflow for reading and exporting graphical (or spatial) elements of layer data for each of the layers in a grouping specified by the mapping output. In some implementations, to export this graphical data of the layers, the graphics sync module 118 calculates dimensional bounds that are used to generate layers including an interactive layer 124 and a visual layer 126. In some implementations, the interactive layer 124 is represented with a format for encoding geographic data structures such as GeoJSON, which is standardized by RFC 7946 of the Internet Engineering Task Force (IETF). In some implementations, the visual layer 126 is represented with graphics format such as scalable vector graphics (SVG). Other format types are possible. In some implementations, the respective outputs of the data sync module 116 and graphics sync module 118 can be stored in a database 120 and later accessed to generate a preview of the data and graphics for a layer or floorplan before final visual rendering. In some implementations, the respective outputs of the data sync module 116 and graphics sync module 118 can be provided to a rendering module 130.

The system 100 includes a rendering module 130 that leverages tile generation technology to graphically render data and graphics for layers specified by the layer mapping output. In this example, the rendering module 130 is coupled for communication with user interface 102 to provide output parameters (e.g., data and graphics elements) for graphically rendering information for a layer as a display output at the user interface 102. The rendering module 130 can include logic for tile generation 128, tile renderer 136, smart renderer 132, and robust renderer 134.

In some implementations, using outputs of the graphics sync module 118 and data sync module 116, rendering module 130 can generate a merged graphics layer 122 by overlaying dimensional coordinates of a GeoJSON file over dimensional coordinates of a SVG file or one or more images tiles generated from the SVG file. The merged graphics layer 122 can be used for presentation of the preview of the data and graphics for the layer or floorplan, presentation of a final version of the layer or floorplan, or both. In some implementations, the system 100 generates the merged graphics layer 122 based on intelligent analytics and calculations related to spatial coordinates and bounds for respective coordinate systems of the SVG file and GeoJSON file or the one or more image tiles and the GeoJSON file.

For the presentation of the merged graphics layer 122, a tile generation module 128 can generate multiple image tiles from a SVG file. The image tiles can have smaller file sizes, smaller dimensions, or both, than the SVG file. As a result, the system 100 or a device that receives the image tiles from the system 100 can require fewer resources for presentation the image tiles on the user interface 102 than if the SVG file was used for presentation of the merged graphics layer 122. For instance, when each image tile has a smaller file size, each image tile requires less memory than the memory required to store the SVG file. Further, the system 100 can send an image tile to the computing device more quickly than an SVG file because of the smaller file size.

In some implementations, a computing device that presents the user interface 102 can render the image tile more efficiently than the SVG file because of the smaller file size. When multiple image tiles depict the data for a single SVG file, the computing device can use multi-threading support, whether virtual or actual, to more quickly present the image tiles on the user interface 102 than presentation of the SVG file on the user interface 102. The computing device can use a first thread for presentation of a first image tile and a second thread for presentation of a second image tile.

The tile generation module 128 can decouple image tile generation from the graphic sync process by offloading image tile generation to a separate background process. For example, the graphics sync module 118 can extract graphic elements from a CAD document to generate an SVG file. After generation of the SVG file, the tile generation module 128 can generate the image tiles from the SVG file. Because image tile generation can take longer than the graphic element extraction process, the graphics sync module 118 can generate only an SVG file which generation process can be faster than the image tile generation. This can enable the system 100 to present the merged graphics layer 122, e.g., in the user interface 102, using an SVG file rather than image tiles more quickly than if the system 100 waited until the image tile generation process completed. Once the tile generation module 128 finishes generation of some of the image tiles, the system 100 can then use the image tiles for the merged graphics layer 122, taking advantage of the smaller file sizes of the image tiles.

The smart renderer 132 can be configured to intelligently switch between non-tile SVG files and image tiles to improve presentation of the merged graphic layers 122 in the user interface 102. In some implementations, the smart renderer 132 enables the rendering module 130 to perform its rendering functions using fewer processor cycles, less memory resources, or both, when dynamic tiling functions of the smart renderer 132 are invoked at the rendering module 130. In some implementations, the smart renderer 132 can enable presentation of the merged graphics layer 122 more quickly using an SVG file than if the merged graphics layer 122 was only presented using image tiles. Hence, the smart renderer 132 can provide improved efficiency relative to other approaches for rendering graphical data at a display.

The robust renderer 134 is configured to overlay data or dimensional coordinates of the GeoJSON file on top of the data or dimensional coordinates of the SVG file, e.g., for the merged graphics layer 122. This overlay feature of the robust renderer 134 is related to the merged graphics layer 122 and intelligent analytics functions described earlier. More specifically, the robust renderer 134 can be used to execute the intelligent analytics and calculations related to spatial coordinates and bounds for respective coordinate systems of the SVG file and GeoJSON file. The robust renderer 134 allows for cooperation between, and integration of, different coordinate systems to allow for visualization of data and graphical elements of drawing layers, e.g., when data for the merged graphics layer 122 is presented on the user interface 102.

When the merged graphics layer 122 includes an interactive GeoJSON layer and multiple image tiles, a tile renderer 136 can coordinate presentation of the GeoJSON layer with the image tiles. For instance, the tile renderer 136 can obtain x-y coordinates in a CAD screen space, e.g., for the user interface 102. The tile renderer 136 can use these coordinate to align the GeoJSON layer with the image tiles. For instance, the tile renderer 136 can convert coordinates for the GeoJSON layer into coordinates for the image tiles.

Figure 2:
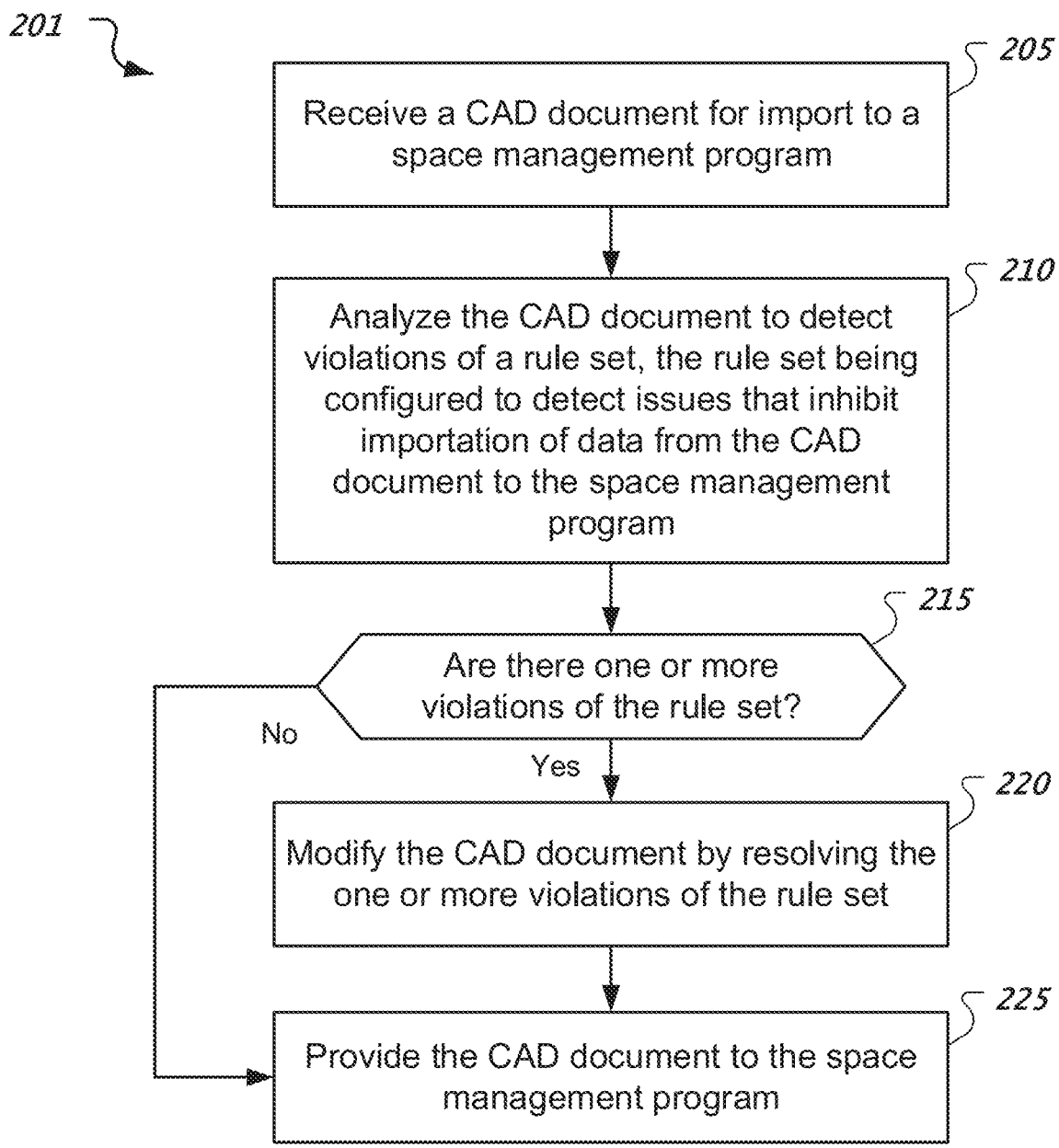
FIG. 2 shows a flowchart of an example of a process for auditing CAD documents.

FIG. 2 shows a flowchart of an example of a process 201 for auditing CAD documents. The process 201 can be performed by one or more processors (e.g., processor 802 of FIG. 8). At 205, the processor receives a CAD document for import to a space management program. In some implementations, a space management program is a software utility for viewing and tracking physical spaces, such as floors of an office building. In some implementations, the processor retrieves a file from local storage. In some implementations, the processor retrieves a pointer to a data structure containing the CAD document or a portion thereof such as a layer. In some implementations, a client transmits the CAD document to the processor via a network, and the processor retrieves the CAD document from a network buffer or other memory holding network communications. Various file formats extensions for a CAD document include DWG, DXF, and DGN. Other formats are possible. In some implementations, the CAD document includes representations for one or more floorplans and associated space information such as space name, space code, and space type. A floorplan is a map for an area, such as a building, park, school, or stadium, and can include information for multiple different levels or a single level. A floorplan can include data for a single level within a multilevel area, e.g., a single floor in a building. In some examples, a floorplan includes data for a portion of an area, e.g., part of a floor within a building or a portion of a park.

At 210, the processor analyzes the CAD document to detect violations of a rule set. The rule set can be configured to detect issues that inhibit importation of data from the CAD document to the space management program. Various examples of rules include rules to check for: unclosed polyline; overlapping polyline; duplicated space code; multiple space code; missing space code; orphan space code; multiple space name; missing space name; orphan space name; multiple space type; missing space type; orphan space type; and invalid space type. Other types of rules are possible. In some implementations, the processor performs one or multiple processes to analyze the CAD document (see, for example, the processes of FIGS. 4, 5, and 6).

At 215, the processor determines whether there are one or more violations of the rule set. If there is at least one violation, then, at 220, the processor modifies the CAD document by resolving the one or more violations of the rule set. In some implementations, modifying the CAD document includes modifying a data structure in memory such as random access memory (RAM). In some implementations, the processor automatically resolves one or more of the violations. In some implementations, user input is solicited to resolve one or more of the violations. The processor can be configured to re-run one or more rule set analyses to verify that there are no remaining issues. If there are no violations, or if all of the violations have been resolved, then at 225 the processor provides the CAD document to the space management program. In some implementations, providing the CAD document to the space management program includes providing a data structure, e.g., a pointer or a file handle, to the space management program.

Figure 3A:
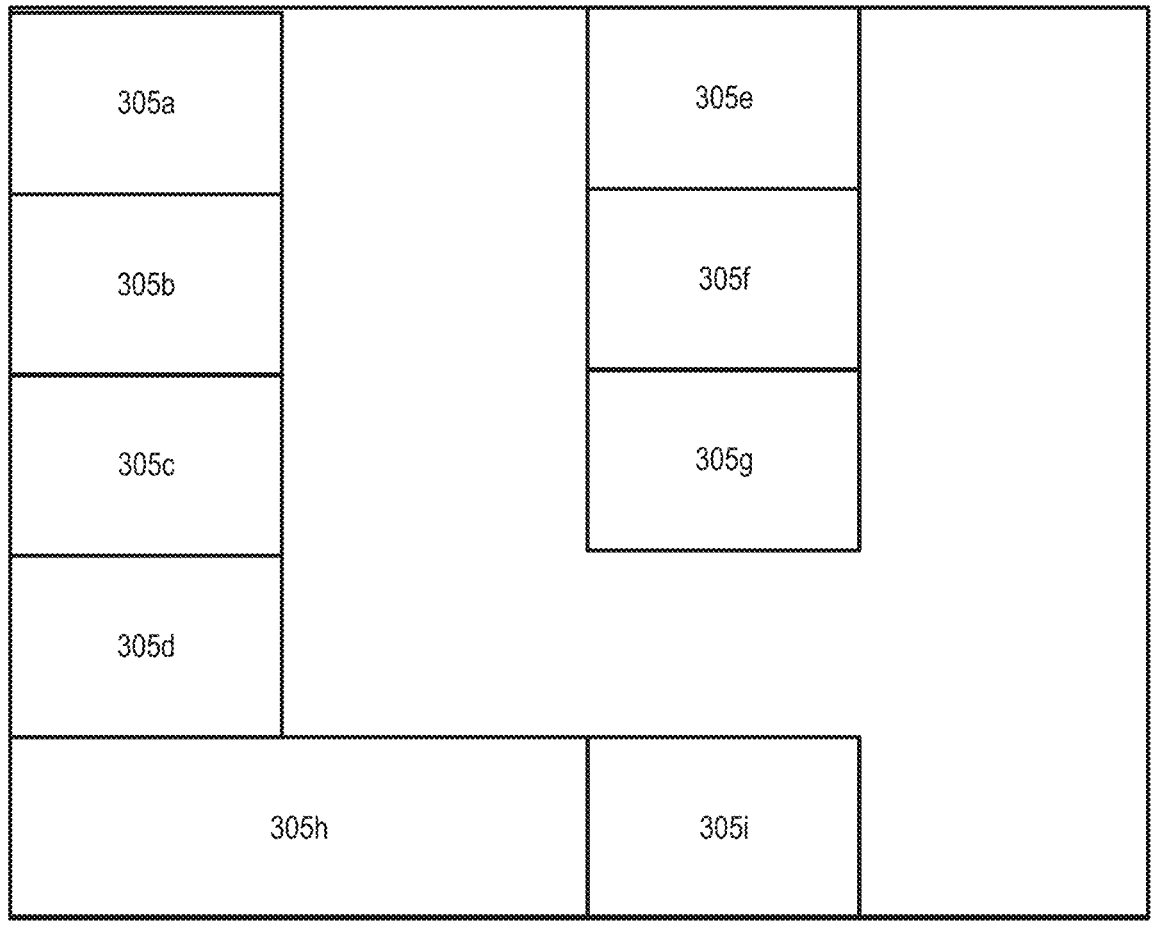
FIGS. 3A and 3B show a layout of an example of a floorplan that is described by a CAD document.
Figure 3B:
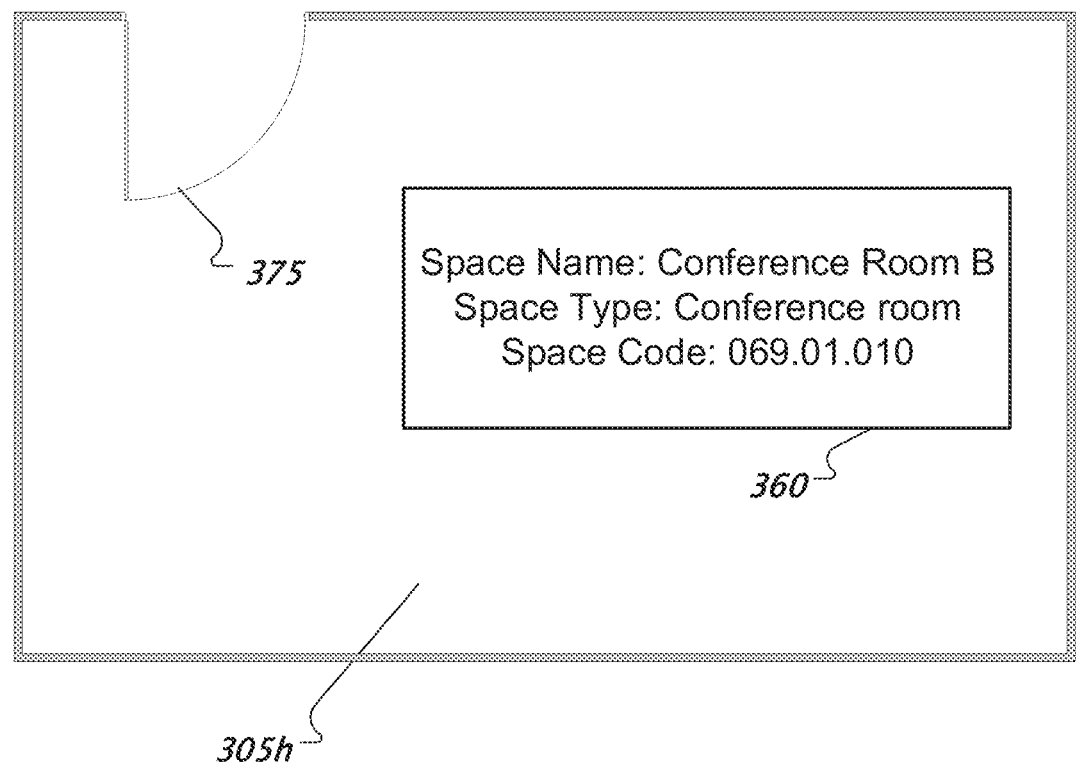

FIGS. 3A and 3B show a layout of an example of a floorplan 301 that is described by a CAD document. In FIG. 3A, the floorplan 301 includes multiple difference regions 305a-i such as private offices, restrooms, and a lobby area. A region in the floorplan is typically bounded by a polyline, which is a continuous line made up of multiple line segments (e.g., line segments that denote a space such as an office or conference room). Each region can be associated with one or more data elements, e.g., space code, space name, and space type. A space code, e.g., a unique identifier such as a number, alphanumerical representation, or string, can be assigned to each region. Further, a space name, e.g., the name of a space, such as Private Office 305, can also be assigned to each region. Finally, a space type, e.g., the type (i.e., purpose) of a space in a building can be assigned to each region.

FIG. 3B shows a portion of the floorplan 301 of FIG. 3A. In this portion, a conference room 305h is depicted. The conference room 305h in the floorplan 301 is bounded by a polyline 375. As depicted the polyline 375 is closed because it completely encloses the region that is the conference room 305h. However, if, for example, a portion of the polyline 375 was not defined or provided (e.g., missing a sidewall, missing the arc showing the door swing, etc.), then the polyline 375 would be deemed unclosed. Data elements 360 can be associated with the conference room 305h, such as a space code, space name, and space type. Other, fewer, or more data elements are possible. Note that other regions depicted by the floorplan 301 can be defined by their own unique polyline and they can also have space code, space name, and space type assignments.

Figure 3C:
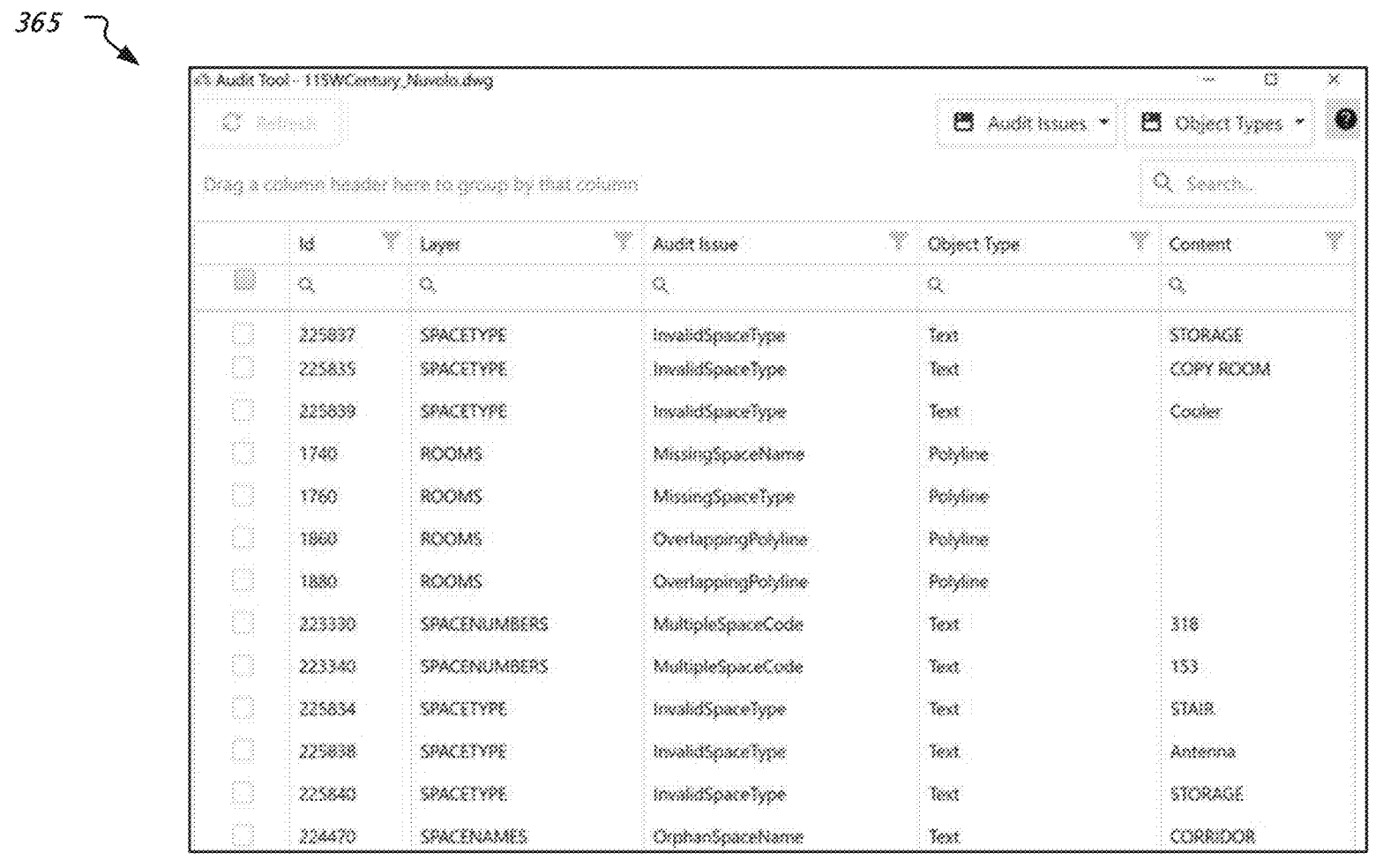

FIG. 3C shows a layout of an example of an audit window 365 that identifies issues associated with metadata for a floorplan. In a CAD program user interface, where a floorplan such as floorplan 301 of FIG. 3A can be displayed, an audit window 365 may appear based on a user's selection of an audit feature. The audit window 365 can be displayed adjacent to the floorplan 301. The audit window 365 can display data elements associated with each region of the floorplan 301. The data elements can include a space code, space name, and space type. The audit window 365 can, for example, be used to browse for issues, and if a specific issue is selected, the CAD program can highlight a corresponding portion of the displayed floorplan 301 and can highlight a row within the audit window 365 that has an issue.

An audit program can apply one or more rule sets to a CAD document to detect issues within the CAD document before contents of the document are imported into a space management program. The space management program can extract details about spaces represented by the CAD document such that the spaces can be efficiently managed. For example, conference-room-type spaces can be detected and loaded into a database object that manages the availability of conference rooms, manages who cleans what rooms, or other types of management functions. Having a missing space type, may prevent the space management program from realizing that there is, for example, another conference room to manage. Thus, the audit program can detect the missing space type and have it added. The space management program can use the floor plan information for space reservation, asset tracking, onboarding of new employees such as space allocation for a new employee or transfer of employee, and routine clean up of employee cubicle or desk. Other uses are possible.

Various rule sets can be applied by the audit program. A rule set, in some implementations, can include one or more polyline rules. A CAD document can define a space by at least partially surrounding an area with a polyline. A polyline can be represented by one or more vectors. An unclosed polyline rule can be configured to detect a polyline which is not closed, e.g., there is a gap between start and end points. An overlapping polyline rule can be configured to detect a polyline that has another polyline crossing any of its edges.

A rule set can include one or more space code rules. A missing space code rule can be configured to detect a condition where a polyline is not associated with a space code. In some implementations, a space code is represented by XX.YY.ZZ, where ZZ represents a floor number, YY represents a zone number, and XX represents a space number. A duplicated space code rule can be configured to detect a condition where the same space code is associated with more than one polyline. A space code should be a unique identifier that is assigned to a single space, and accordingly a single polyline, within the CAD document. The unique identifier can include a unique number or a unique string. This rule can be used to enforce that all space codes within the CAD document are unique.

A multiple space code rule can be configured to detect a condition where a polyline is associated with two or more space codes. An orphan space code rule can be configured to detect a space code which does not have a surrounding polyline, e.g., it is not clear what region is associated with the space code, and accordingly the space code is considered to be orphaned.

A rule set can include one or more space name rules. A missing space name rule can be configured to detect a condition where a polyline is not associated with a space name. Various examples of space names include main conference room, Mr. Smith's office, restroom, janitor's closet, electrical closet, etc. A multiple space name rule can be configured to detect a condition where a polyline is associated with two or more space names. An orphan space name rule can be configured to detect a space name which does not have a surrounding polyline, e.g., it is not clear what region is associated with the space name, and accordingly the space name is considered to be orphaned.

A rule set can include one or more space type rules. A missing space type rule can be configured to detect a condition where a polyline is not associated with a space type. Examples of space types include office space, utility space, conference room space, etc. A multiple space type rule can be configured to detect a condition where a polyline is associated with two or more space types. An orphan space type rule is configured to detect a space code which does not have a surrounding polyline, e.g., it is not clear what region is associated with the space type, and accordingly the space type is considered to be orphaned. An invalid space type rule is configured to detect a space code which does not match in a set of valid space types.

Figure 4:
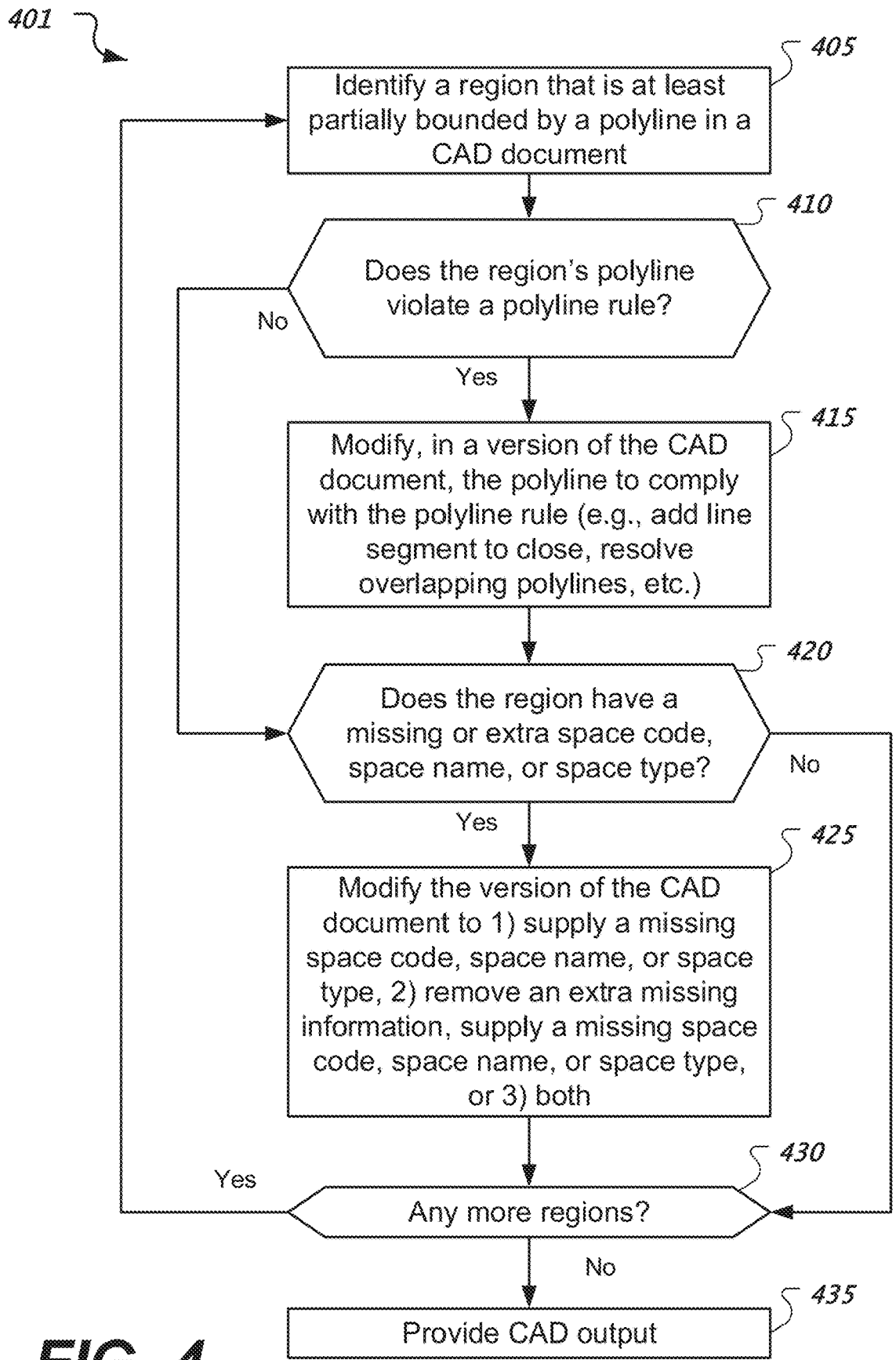
FIG. 4 shows a flowchart of an example of a process for detecting and resolving unclosed polylines, missing space codes, missing space names, missing space types, extra space codes, extra space names, or extra space types.

FIG. 4 shows a flowchart of an example of a process 401 for detecting and resolving unclosed polylines, missing space codes, missing space names, missing space types, extra space codes, extra space names, or extra space types. The process 401 can be performed by one or more processors (e.g., processor 802 of FIG. 8). At 405, the processor identifies a region that is at least partially bounded by a polyline in a CAD document. At 410, the processor determines whether the region's polyline violates a polyline rule, e.g., whether the polyline is unclosed or another polyline crosses the polyline.

If there is a violation, the processor, at 415, modifies the polyline to comply with the polyline rule in a version of the CAD document. Examples of such modifications include adding a line segment to close an unclosed polyline, resolving overlapping polylines, or both. Other types of modifications are possible.

At 420, the processor determines whether the region has a missing or extra space code, space name, or space type. If there is a missing or extra space code, space name, or space type, then at 425 the processor modifies the version of the CAD document to 1) supply a missing space code, space name, or space type, 2) remove an extra missing information, supply a missing space code, space name, or space type, or 3) both. In some implementations, the processor resolves the violation of a rule by providing a notification regarding the rule violation to a user, and receiving a user input that helps to resolve the violation (e.g., an input that includes a string containing a name for a region that is missing a space name).

At 430, the processor determines whether the region there is another region, and if there is another region continues at 405. Otherwise, the processor, at 435, provides a CAD output. The CAD output can be based on the modified version of the CAD document (if modified) or based on the original CAD document (if not modified). In some implementations, modifying the version of the CAD document at 415 or at 425 includes modifying an in-memory version of the CAD document. Providing the CAD output at 435 can include providing a pointer to the in-memory version of the CAD document. In some implementations, providing the CAD output at 435 includes saving the modified version of the CAD document to a file storage such as a local file storage or a cloud-based file storage.

Figure 5:
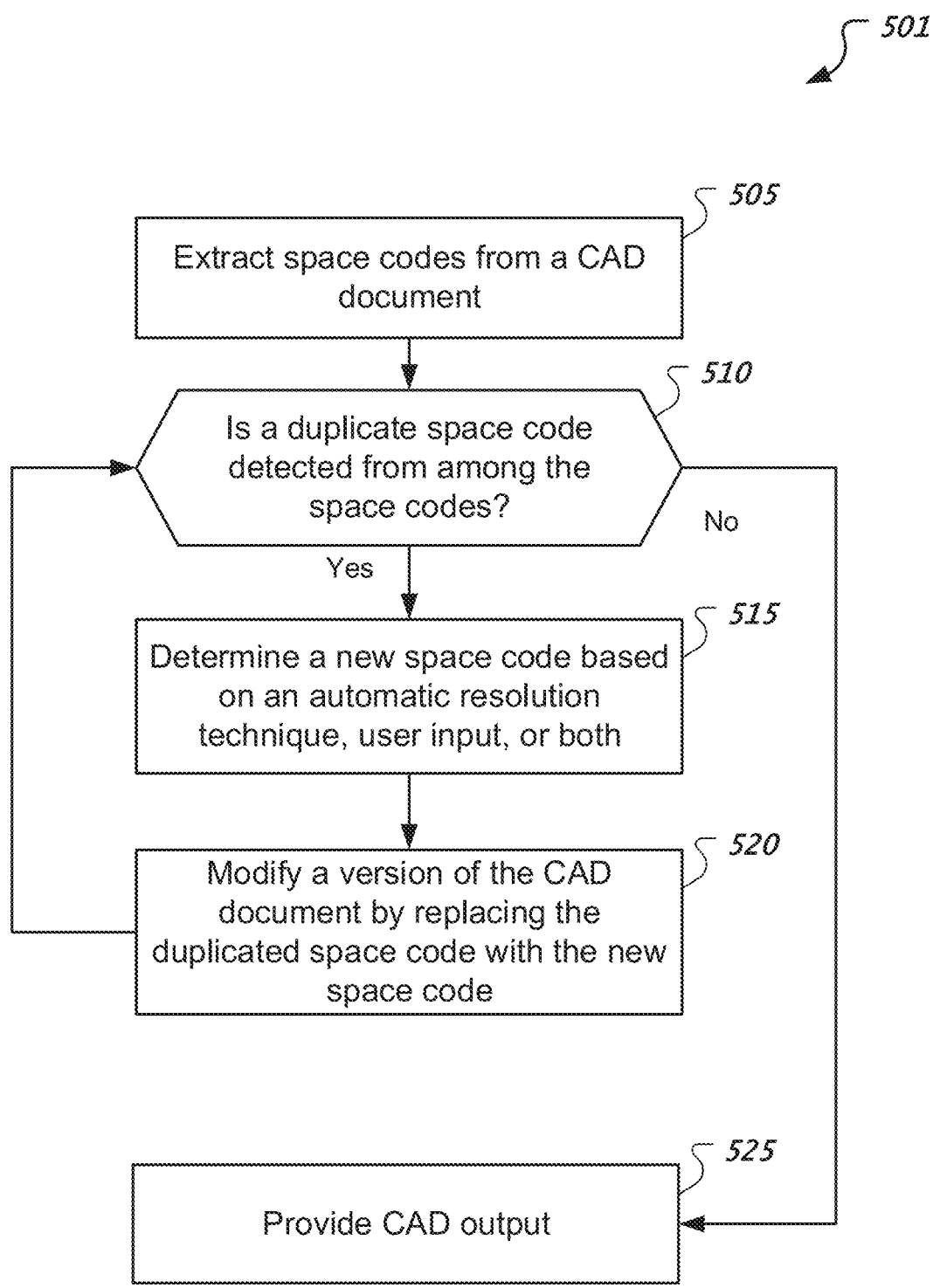
FIG. 5 shows a flowchart of an example of a process for detecting and resolving a duplicate space code.

FIG. 5 shows a flowchart of an example of a process 501 for detecting and resolving a duplicate space code. The process 501 can be performed by one or more processors (e.g., processor 802 of FIG. 8). At 505, the processor extracts space codes from a CAD document. At 510, the processor determines whether a duplicate space code is detected from among the space codes. If there are no duplicate space codes, the processor provides CAD output at 525.

If there are duplicate space codes, then at 515, the processor determines a new space code based on an automatic resolution technique, user input, or both. At 520, the processor modifies a version of the CAD document by replacing the duplicated space code with the new space code. In some implementations, the automatic resolution technique includes appending a value to a space code to produce a new space code. In some implementations, the automatic resolution technique includes finding an unassigned space code that is available for a given floor, replacing the duplicated space code with the unassigned space code, and causing the unassigned space code to become assigned (in case there is another duplicate space code). In some implementations, the processor causes a dialog box to appear that indicates the duplicate space code and accepts a user input that is used to change the duplicate space code. Modifying the version of the CAD document at 520 can include modifying an in-memory version of the CAD document.

The process 501 continues at 510 to detect and resolve any remaining duplicate space codes. If there are no more duplicates, then the processor provides a CAD output at 525. In some implementations, providing the CAD output includes providing a pointer to the in-memory version of the CAD document. In some implementations, providing the CAD output includes saving the modified version of the CAD document to a file storage such as a local file storage or a cloud-based file storage.

Figure 6:
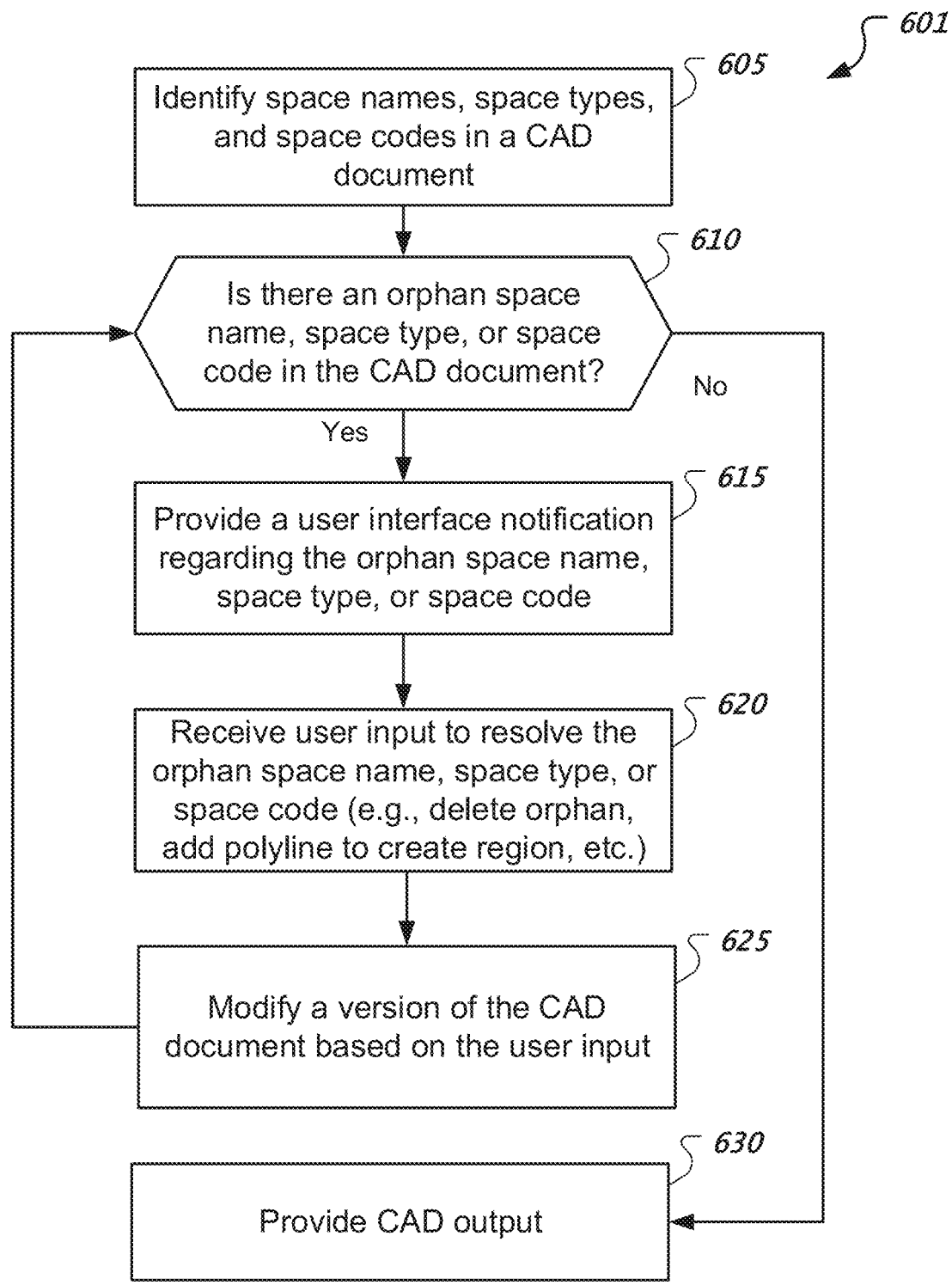
FIG. 6 shows a flowchart of an example of a process for detecting and resolving orphan space names, space types, or space codes.

FIG. 6 shows a flowchart of an example of a process 601 for detecting and resolving orphan space names, space types, or space codes. The process 601 can be performed by one or more processors (e.g., processor 802 of FIG. 8). At 605, the processor identifies space names, space types, and space codes in a CAD document. At 610, the processor determines if there is an orphan space name, space type, or space code in the CAD document. If there are no orphans, the process 601 continues at 630.

If there is an orphan, then at 615, the processor provides a user interface notification regarding the orphan space name, space type, or space code. At 620, the processor receives user input to resolve the orphan space name, space type, or space code. In some implementations, the user input indicates that the orphan should be deleted. In some implementations, the user input indicates that a polyline should be added to create a region such that the orphan space name, space type, or space code is no longer an orphan. At 625, the processor modifies a version of the CAD document based on the user input. Modifying a version of the CAD document based on the user input can include deleting an orphan or creating a region to make it no longer an orphan. The process 601 continues at 610 to resolve any remaining orphans.

If there are no orphans or no remaining orphans, then at 630, the processor provides a CAD output. The CAD output can be based on the modified version of the CAD document (if modified) or based on the original CAD document (if not modified). In some implementations, modifying the version of the CAD document at 625 includes modifying an in-memory version of the CAD document. Providing the CAD output at 630 can include providing a pointer to the in-memory version of the CAD document. In some implementations, providing the CAD output at 630 includes saving the modified version of the CAD document to a file storage such as a local file storage or a cloud-based file storage.

Figure 7:
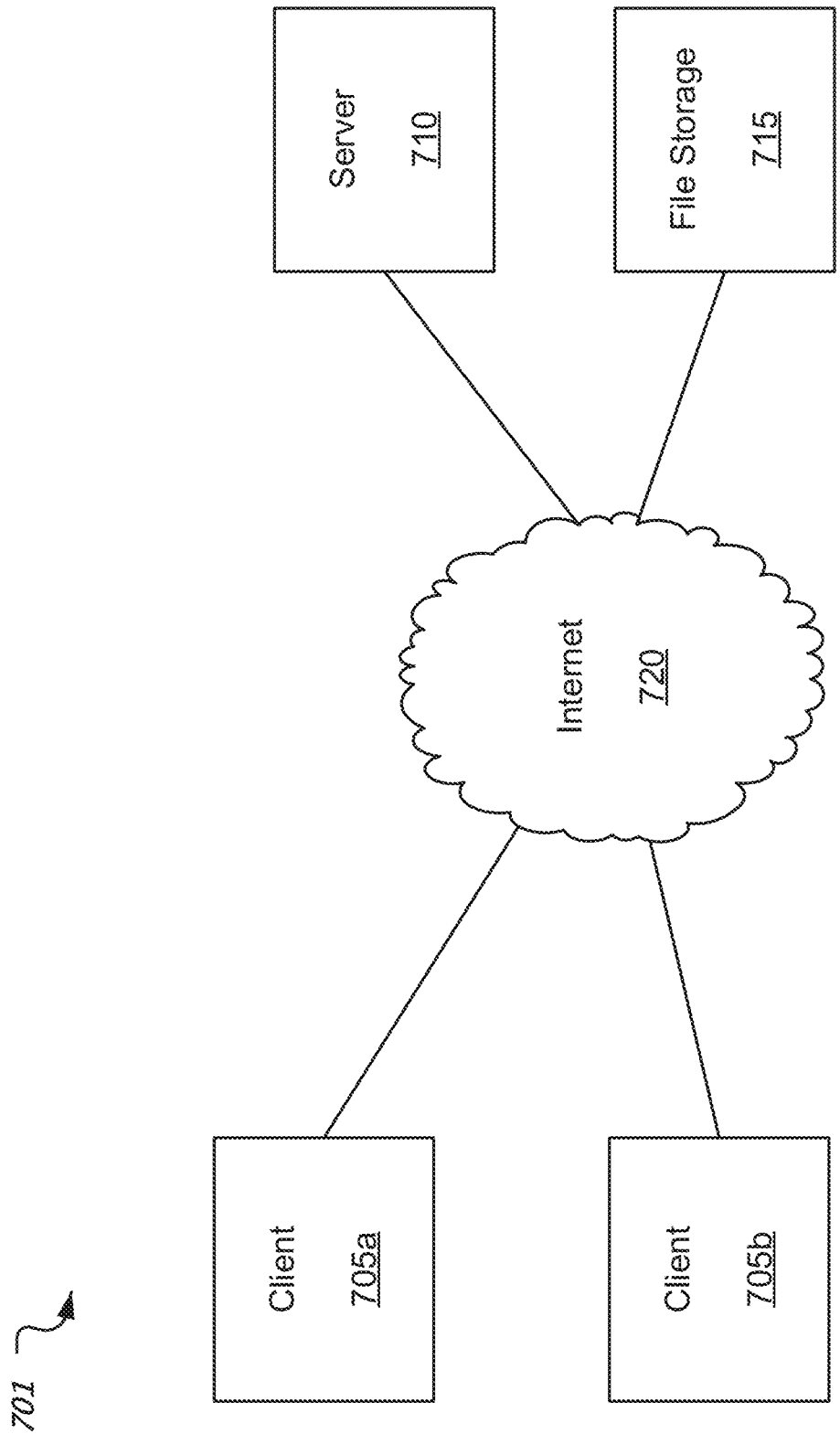
FIG. 7 shows an example of a network architecture.

FIG. 7 shows an example of a network architecture 701 which can be used to implement one or more of the systems and techniques described herein. The network architecture 701 includes clients 705*a*, 705*b*, a network such as the Internet 720, a server 710, and file storage 715. In this example, the file storage 715 resides within a cloud-based storage provider that provides file storage over a public network. In some implementations, the file storage 715 resides on the same private network as the server 710. In some implementations, the server 710 includes the file storage 715. In some implementations, a client 705*a-b* can cause a server 710 to retrieve a CAD document from the file storage 715. The server 710 can execute an audit program on the retrieved CAD document, and resolve any issues before importing the CAD document into a space management program. In some implementations, the client 705*a-b* can use a web browser to interact with a CAD program, audit program, or space management program on the server 710.

Figure 8:
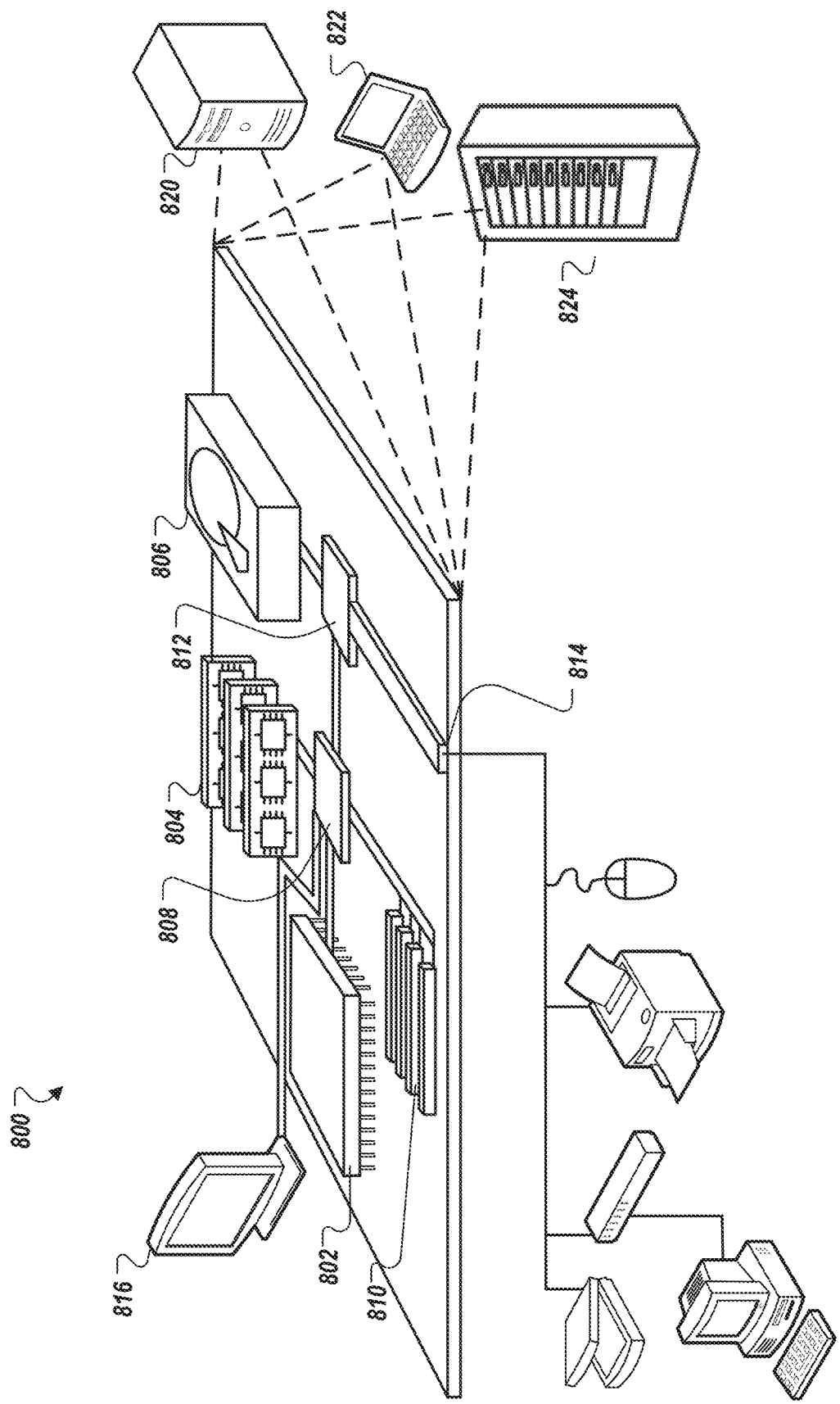
FIG. 8 shows a diagram of an example of a computing device.

FIG. 8 shows a diagram of an example of a computing device 800 which can be used to implement one or more of the systems and techniques described herein, as either a client, clients, server, servers, etc. In some implementations, the computing device 800 is referred to as a data processing apparatus. Computing device 800 is intended to represent various forms of digital computers, such as laptops, mobile devices, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low-speed interface 812 connecting to low-speed bus 814 and storage device 806. Each of the components 802, 804, 806, 808, 810, and 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high-speed interface 808. In other implementations, multiple processors and/or multiple buses can be used, as appropriate, along with multiple memories and types of memory. Also, multiple computing devices 800 can be connected, with each device providing portions of the necessary operations (e.g., as a server bank, a group of blade servers, or a multi-processor system).

The memory 804 stores information within the computing device 800. In one implementation, the memory 804 includes a computer-readable medium such as a flash memory. In one implementation, the memory 804 includes a volatile memory unit or units such as RAM. In another implementation, the memory 804 includes a non-volatile memory unit or units.

The storage device 806 is capable of providing mass storage for the computing device 800. In one implementation, the storage device 806 is a computer-readable medium such as a hard drive or solid state drive. In various different implementations, the storage device 806 can be a floppy disk device, a hard disk device, an optical disk device, or a tape device, a flash memory or other similar solid state memory device, or an array of devices, including devices in a storage area network or other configurations. The computer program product contains instructions that, when executed, perform one or more methods, such as those described above.

The high-speed interface 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which can include various communication ports (e.g., universal serial bus (USB), Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a server 820, or multiple times in a group of such servers. It may also be implemented as part of a rack server system 824. In addition, it can be implemented in a personal computer such as a laptop computer 822.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; USB drive, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the inventions have been described. Other embodiments are within the scope of the following claims. In addition, actions recited in the claims can be performed in a different order and still achieve desirable results.

What is claimed is:

1. A method comprising:
    receiving a computer-aided design document for import to a space management program;
    determining whether the computer-aided design document violates a rule set comprising a set of valid space types by determining whether a space type included in the computer-aided design document is in the set of valid space types, wherein the rule set is configured to detect issues that inhibit importation of data from the computer-aided design document to the space management program;
    selectively modifying the computer-aided design document by resolving a violation of the rule set; and
    providing the computer-aided design document to the space management program.

2. The method of claim 1, wherein determining whether the computer-aided design document violates the rule set comprises determining a region that is at least partially bound by a polyline within the computer-aided design document.

3. The method of claim 2, wherein determining whether the computer-aided design document violates the rule set comprises determining whether the polyline is unclosed or overlaps with another polyline within the computer-aided design document.

4. The method of claim 2, wherein determining whether the computer-aided design document violates the rule set comprises detecting whether the region is associated with two or more space codes, space names, or space types.

5. The method of claim 2, wherein determining whether the computer-aided design document violates the rule set comprises detecting whether the region is not associated with a space code, space name, or space type.

6. The method of claim 1, wherein determining whether the computer-aided design document violates the rule set comprises detecting a space code of the computer-aided design document, and determining whether the space code is a duplicate space code within the computer-aided design document.

7. The method of claim 1, wherein determining whether the computer-aided design document violates the rule set comprises detecting whether there is a space code, space name, or space type that is not associated with a region that is at least partially bound by a polyline within the computer-aided design document.

8. The method of claim 1, wherein modifying the computer-aided design document by resolving the violation of the rule set comprises:
providing a notification regarding the violation of the rule set;
receiving a user input to resolve the violation of the rule set; and
modifying the computer-aided design document based on the user input.

9. The method of claim 8, wherein the notification comprises a suggested resolution of the violation of the rule set.

10. The method of claim 1, wherein modifying the computer-aided design document comprises modifying a data structure, and wherein providing the computer-aided design document to the space management program comprises providing the data structure to the space management program.

11. A system comprising:
a processor; and
a computer-readable storage medium coupled with the processor, wherein the computer-readable storage medium comprising a program for execution by the processor, the program including instructions which, when executed by the processor, cause the processor to perform operations comprising:
receiving a computer-aided design document for import to a space management program;
determining whether the computer-aided design document violates a rule set comprising a set of valid space types by determining whether a space type included in the computer-aided design document is in the set of valid space types, wherein the rule set is configured to detect issues that inhibit importation of data from the computer-aided design document to the space management program;
selectively modifying the computer-aided design document by resolving a violation of the rule set; and
providing the computer-aided design document to the space management program.

12. The system of claim 11, wherein determining whether the computer-aided design document violates the rule set comprises determining a region that is at least partially bound by a polyline within the computer-aided design document.

13. The system of claim 12, wherein determining whether the computer-aided design document violates the rule set comprises determining whether the polyline is unclosed or overlaps with another polyline within the computer-aided design document.

14. The system of claim 12, wherein determining whether the computer-aided design document violates the rule set comprises detecting whether the region is associated with two or more space codes, space names, or space types.

15. The system of claim 12, wherein determining whether the computer-aided design document violates the rule set comprises detecting whether the region is not associated with a space code, space name, or space type.

16. The system of claim 11, wherein determining whether the computer-aided design document violates the rule set comprises detecting a space code of the computer-aided design document, and determining whether the space code is a duplicate space code within the computer-aided design document.

17. The system of claim 11, wherein determining whether the computer-aided design document violates the rule set comprises detecting whether there is a space code, space name, or space type that is not associated with a region that is at least partially bound by a polyline within the computer-aided design document.

18. The system of claim 11, wherein modifying the computer-aided design document by resolving the violation of the rule set comprises:
providing a notification regarding the violation of the rule set;
receiving a user input to resolve the violation of the rule set; and
modifying the computer-aided design document based on the user input.

19. The system of claim 18, wherein the notification comprises a suggested resolution of the violation of the rule set.

20. The system of claim 11, wherein modifying the computer-aided design document comprises modifying a data structure, and wherein providing the computer-aided design document to the space management program comprises providing the data structure to the space management program.

21. A non-transitory computer-readable storage medium comprising a program for execution by a processor of a device, the program including instructions which, when executed by the processor, cause the device to perform operations comprising:
receiving a computer-aided design document for import to a space management program;
determining whether the computer-aided design document violates a rule set comprising a set of valid space types by determining whether a space type included in the computer-aided design document is in the set of valid space types, wherein the rule set is configured to detect issues that inhibit importation of data from the computer-aided design document to the space management program;
selectively modifying the computer-aided design document by resolving a violation of the rule set; and
providing the computer-aided design document to the space management program.

* * * * *